United States Patent
Leman et al.

(10) Patent No.: US 6,222,735 B1
(45) Date of Patent: Apr. 24, 2001

(54) MINITOWER COMPUTER HOUSING AND MINITOWER COMPUTER

(75) Inventors: Michael Leman, Eagle, ID (US); Jacques Gagne, Los Altos, CA (US); Philip Hartley, San Francisco, CA (US); Ray Gradwohl, Saratoga, CA (US)

(73) Assignee: Micron Electronics, Inc., Nampa, ID (US)

( * ) Notice: Subject to any disclaimer, the term of this patent is extended or adjusted under 35 U.S.C. 154(b) by 0 days.

(21) Appl. No.: 09/363,453

(22) Filed: Jul. 29, 1999

(51) Int. Cl.[7] .............................. G06F 1/16; G06F 7/20
(52) U.S. Cl. ..................... 361/724; 361/687; 361/683; 312/223.1; 312/223.2; 248/371; 248/346.01; D14/100; D14/107
(58) Field of Search ................................. 361/683, 686, 361/680, 724, 725, 727, 657; 312/223.1, 223.2; D14/100, 107; 248/371, 346.01

(56) References Cited

U.S. PATENT DOCUMENTS

| | | | |
|---|---|---|---|
| D. 279,187 | * 6/1985 | Tsumura et al. | D14/100 |
| D. 312,624 | * 12/1990 | Tedham | D14/100 |
| D. 335,489 | * 5/1993 | Sander | D14/100 |
| D. 357,232 | * 4/1995 | Merino | D14/100 |
| D. 365,087 | * 12/1995 | Martin et al. | D14/100 |
| D. 393,248 | * 4/1998 | Lin | D14/100 |
| D. 400,867 | * 11/1998 | Chen et al. | D14/100 |
| 5,271,239 | 12/1993 | Rockenfeller et al. | |
| 5,388,792 | * 2/1995 | Hastings et al. | 248/346.01 |
| 5,593,219 | * 1/1997 | Ho | 312/223.1 |
| 5,749,637 | * 5/1998 | McMahan et al. | 312/223.2 |
| 5,751,550 | 5/1998 | Korinsky | |
| 5,818,688 | * 10/1998 | Gluskoter et al. | 361/680 |
| 5,818,690 | * 10/1998 | Spencer | 361/680 |
| 5,947,570 | * 9/1999 | Anderson et al. | 312/223.2 |
| 6,137,677 | * 10/2000 | Ganthier et al. | 361/683 |

OTHER PUBLICATIONS

U.S. Ser. No. 09/363,202, Lehman et al., filed Jul. 29, 1999.

* cited by examiner

Primary Examiner—Leo P. Picard
Assistant Examiner—Lisa Lea-Edmonds
(74) Attorney, Agent, or Firm—Perkins Coie LLP (57) ABSTRACT

Minitower computers and housings for protecting the internal and external hardware components of minitower computers. In one embodiment, a minitower computer housing includes a component panel, an under section extending rearwardly from the component panel, and a cover section connected to the component panel and the under section. The housing of this embodiment also includes a first tilt member depending from the under section to tilt the front panel. The first tilt member includes a vent to provide airflow through the computer housing. The first tilt member, for example, can have a front surface extending downwardly from the component panel to a bottom region and a back surface extending upwardly from the bottom region to the under section. The vent can be an opening in the back surface of the tilt member to direct sound waves rearwardly away from a user.

35 Claims, 7 Drawing Sheets

MINITOWER COMPUTER HOUSING AND MINITOWER COMPUTER

TECHNICAL FIELD

The present invention relates to computers, and, more particularly, to minitower computers and housings for minitower computers.

BACKGROUND OF THE INVENTION

Personal computer systems are typically small systems that have a computer or processing unit, a display, and several input devices. The computer has a housing and a plurality of internal hardware components in the housing. The internal hardware components typically include a processor, memory devices, power supplies, fans, buses and many other internal components. The display and input devices are coupled to the computer. In most applications, the input devices are a keyboard to transmit alphanumeric commands to the computer and a mouse, track-ball or joystick to control items shown on the display.

Minitower computers are a popular type of personal computer for desktop and other applications. In contrast to conventional low-profile desktop computers, the height of a minitower computer is significantly larger than the width. A typical minitower computer housing includes a front panel; a rear panel spaced rearwardly from the front panel; first and second side panels extending along first and second sides of the front and rear panels; a top panel extending between the top portions of the front and rear panels; and a bottom panel extending between the bottom portions of the front and rear panels. The panels define a cavity in which the internal hardware components are enclosed. Several housings for minitower computers also have a plurality of feet depending from the bottom panel to support the computers on a floor, shelf, desktop, table or other support surface. The front panel of the computer housing is also configured to receive external hardware components (e.g., CD-ROM drives, tape drives and external disk drives). The external hardware components, for example, are typically received in a plurality of bays in the front panel. Additionally, the front panel, the rear panel, the bottom panel and/or one of the first or second side panels can also have openings to vent the cavity.

One drawback of minitower computers is that it is difficult to operate some of the external components in the front panel of the housing. For example, when a minitower computer is placed on a support surface below the user (e.g., a floor or low shelf), it can be cumbersome to close the tray of a CD-ROM drive because the CD-ROM control buttons are often underneath the tray. The control buttons in this situation are not only difficult to reach, but they are often obstructed from view, thus making it even more difficult to operate CD-ROM drives. Many users can also have difficulty with handling floppy disks in external disk drives for similar reasons. In other applications in which a minitower computer is supported by a desktop, it can be cumbersome to correctly position compact disks in the CD-ROM drive. Therefore, one drawback of conventional minitower computers is that it can be inconvenient to operate the external hardware components at the front panel of the housing.

Another drawback of minitower computers, as well as conventional low-profile desktop computers, is that they are noisy and often acoustically annoying. Most personal computers have fans to cool the high performance processors. The fans, however, produce a constant, relatively high-pitched tone that can be annoying and even disruptive in a quiet environment. The openings in the housing, moreover, typically channel the fan-noise toward the user or a wall that reflects the fan noise toward the user. Therefore, another drawback of personal computers is that they are noisy and even annoying.

SUMMARY OF THE INVENTION

The present invention is directed toward minitower computers and housings for minitower computers that protect the internal and external hardware components. In one embodiment, a minitower computer housing includes a component panel, an under section extending rearwardly from the component panel, and a cover section connected to the component panel and the under section. The housing of this embodiment also includes a first tilt member depending from the under section, and the first tilt member includes a vent facing away from a location of a user. The first tilt member tilts the front panel either upwardly or downwardly, and the vent provides airflow through the computer housing.

The component panel, more particularly, can have an upper portion and a lower portion. The under section can accordingly have a first segment at the lower portion of the component panel and a second segment spaced apart from the first segment toward the rear of the housing. The cover section extends from the upper portion of the component panel and along the under section such that the component panel, the under section and the cover section define a cavity that is vented by the vent in the tilt member.

The first tilt member can depend from the under section proximate to either the first segment or the second segment to tilt the component panel either upwardly or downwardly, respectively. In one particular embodiment, the first tilt member depends downwardly from the first segment of the under section, and the first tilt member extends across the full width of the housing. The first tilt member of this embodiment accordingly tilts the component panel upwardly and rearwardly to provide better access to the external hardware components. The first tilt member in this embodiment also has a forward surface directed toward the user location and a back surface directed away from the user location. The vent can be positioned in the back surface of the first tilt member to direct sound waves downwardly and rearwardly away from the user location. Therefore, this embodiment of the minitower computer housing is also expected to reduce the decibel level of noise forwardly of the computer housing.

DETAILED DESCRIPTION OF THE INVENTION

The following description is generally directed toward housings for minitower computers and other types of personal computers. Many specific details of certain embodiments of the invention are set forth in the following description and in FIGS. 1–7 to provide a thorough understanding of such embodiments. One skilled in the art, however, will understand that the present invention may have additional embodiments, or that the present invention may be practiced without several of the details described in the following description.

Figure 1:
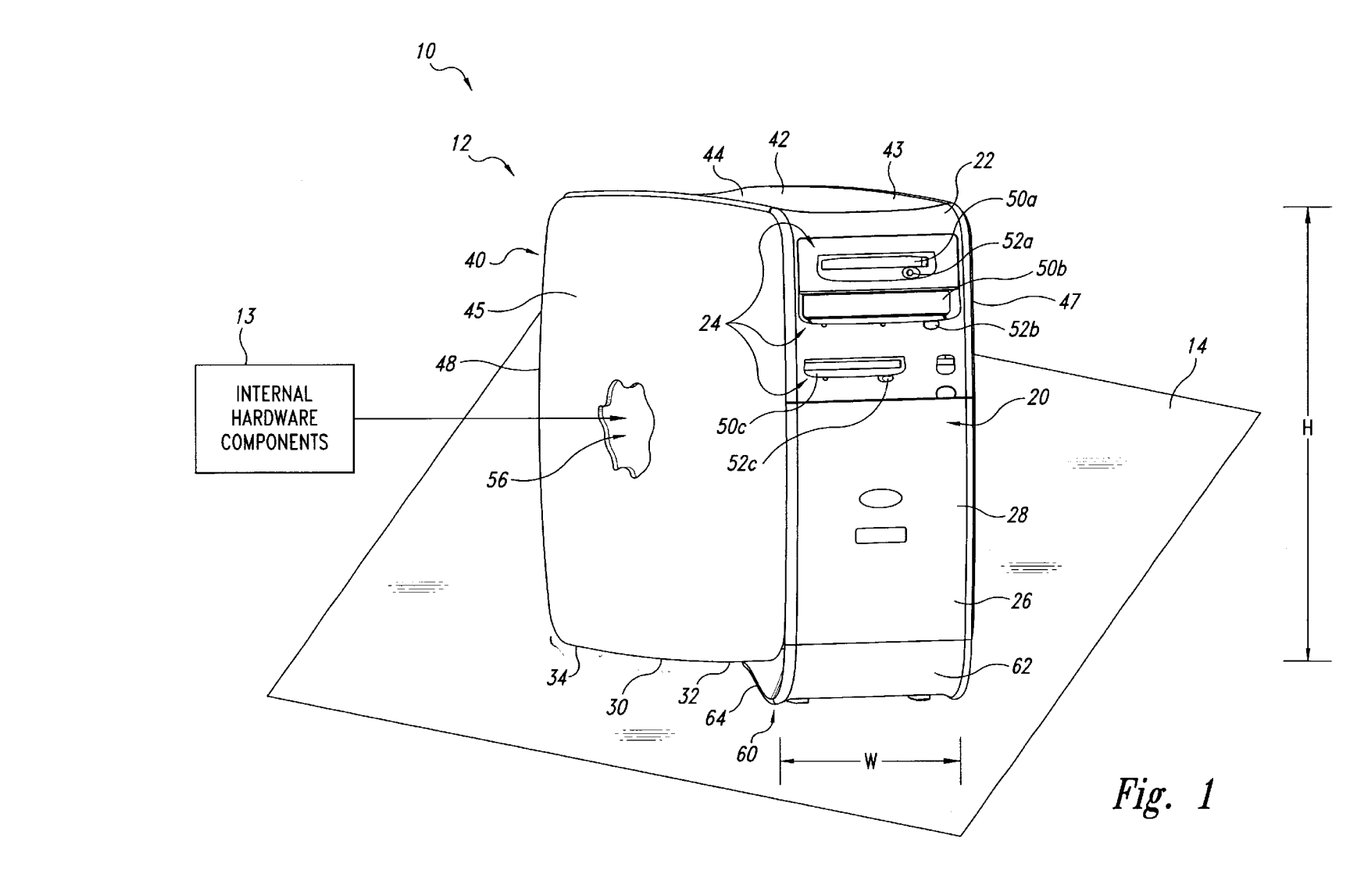
FIG. 1 is a front isometric view of a minitower computer in accordance with one embodiment of the invention.

FIG. 1 is a front isometric view of a minitower computer 10 having a housing 12 in accordance with one embodiment of the present invention. In this embodiment, the housing 12 has a height H that is significantly greater than a width W. As explained in more detail below, the housing 12 is also configured to vent internal hardware components 13 in the housing 12 and to tilt the computer 10 upwardly with respect to a support surface 14.

In this particular embodiment, the housing 12 includes a component panel or front panel 20, an under section or bottom panel 30 extending rearwardly from the component panel 20, and a cover section or upper section 40 connected to the component panel 20 and the under section 30. The component panel 20 can have an upper portion 22 with a plurality of bays or ports 24 and a lower portion 26 with a solid surface 28. A number of external hardware components 50 (identified by reference numbers 50a–50c) are positioned in the bays 24 of the component panel 20. The external hardware components 50 can include, at least in part, a tape drive 50a, a CD-ROM drive 50b and/or a floppy disk drive 50c. The external hardware components 50 generally have control buttons or switches 52 (identified by reference numbers 52a–52c).

Figure 2:
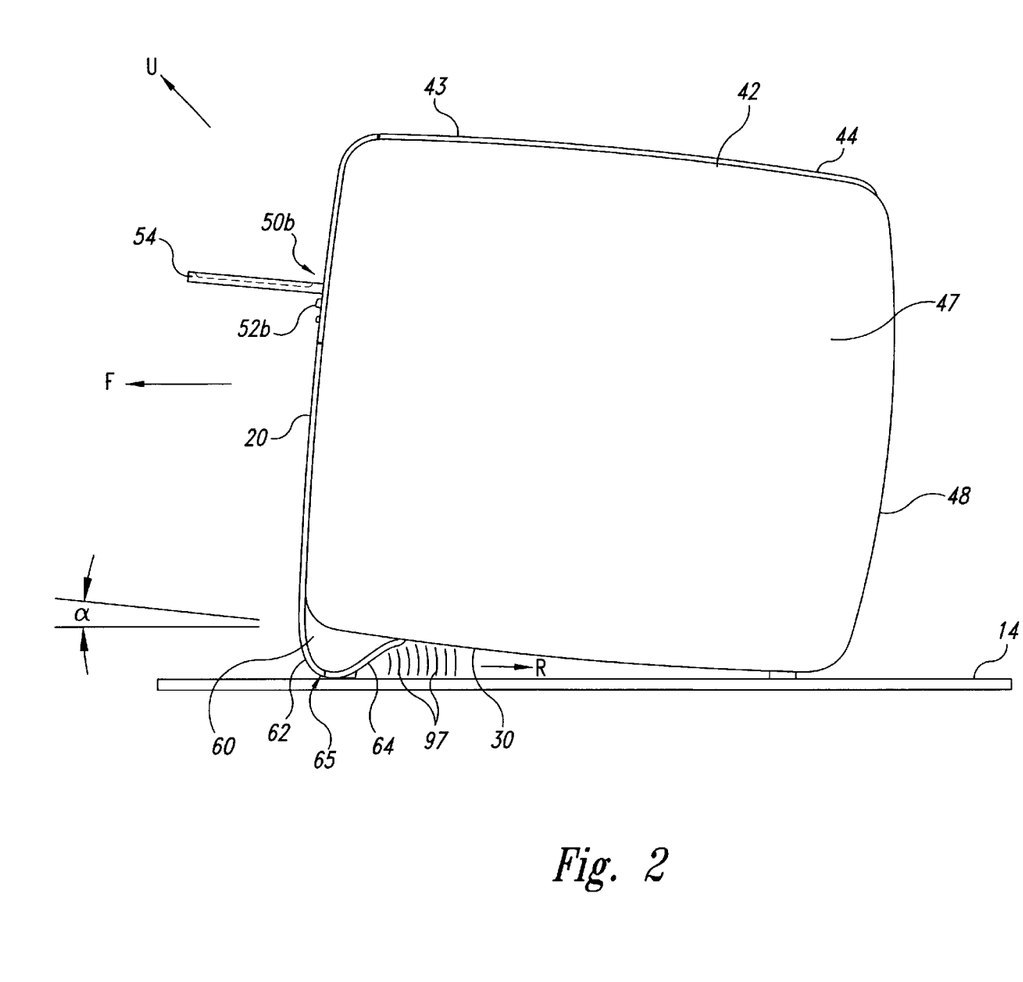
FIG. 2 is a side elevational view of the minitower computer of FIG. 1.

The housing 12 can have several different shapes and configurations. In this particular embodiment, the under section 30 has a first segment or front portion 32 at the lower portion 26 of the component panel 20, and it has a second segment or rear portion 34 spaced rearwardly apart from the front portion 32. The cover section 40 of this embodiment has a top panel 42, first and second side panels 45 and 47, and a rear or back panel 48. The top panel 42 can accordingly have a front segment 43 at the upper portion 22 of the component panel 20, and it can have a rear segment 44 spaced rearwardly apart from the front segment 43. The cover section 40 can also have many other configurations, including a generally rearwardly, downwardly sloped top surface with contiguous side panels (not shown). As such, the top panel 42 and the back panel 48 are not necessarily distinct surfaces as shown in FIGS. 1 and 2. The component panel 20, the under section 30, and the cover section 40 define an enclosed cavity 56 for housing the internal hardware components 13, such as a processor, memory devices, fans, power supplies, buses, communication devices, etc.

Figure 3:
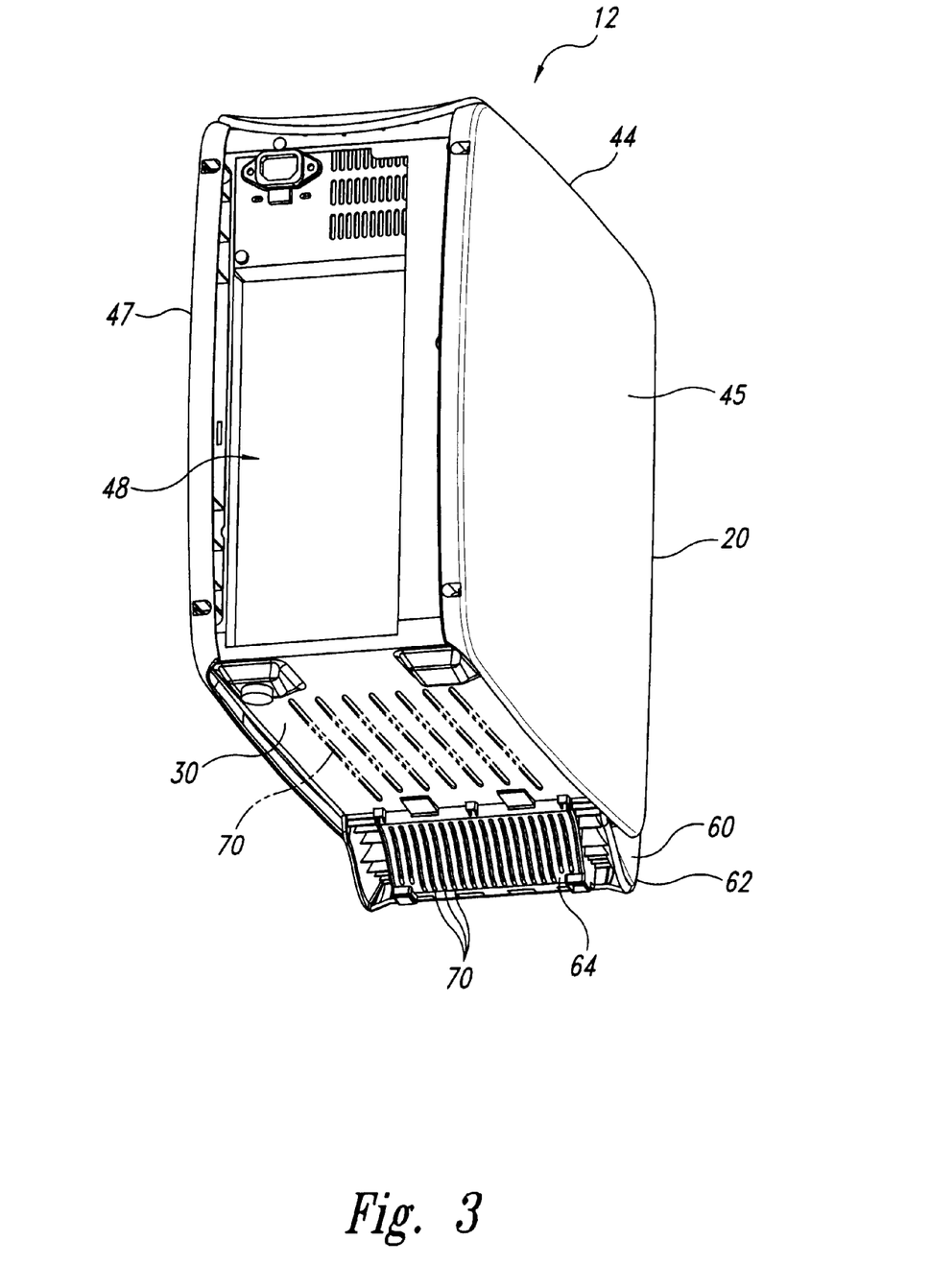
FIG. 3 is a rear isometric view of the minitower computer of FIG. 1.

FIG. 2 is a side elevation view and FIG. 3 is a rear isometric view of the minitower computer housing 12. Referring to FIGS. 1–3 together, this embodiment of the housing 12 further includes a first tilt member or first foot 60 depending from the front portion 32 of the under section 30. The first tilt member 60 can include a front surface 62 facing generally forwardly (arrow F in FIG. 2) in the direction of the component panel 20 and a back surface 64 facing generally rearwardly (arrow R in FIG. 2) toward the back panel 48. The front surface 62 can extend downwardly and rearwardly from the component panel 20 to a bottom region 65, and the back surface 64 can extend upwardly and rearwardly from the bottom region 65 to the under section 30. The front surface 62 and the back surface 64, for example, can be curved surfaces. As best shown in FIG. 2, the first foot 60 tilts or otherwise inclines the housing 12 upwardly and rearwardly at an angle α, which is generally from 1°–30°.

The first foot 60 can also have a plurality of vents 70 in the back surface 64. In this embodiment, the vents 70 are a plurality of slots or other types of openings in the back surface 64 that face rearwardly toward the back panel 48 and downwardly toward the support surface 14. The housing 12 can also have additional vents 70 in the under section 30 and/or the back panel 48.

The embodiment of the minitower housing 12 shown in FIGS. 1–3 is expected to reduce noise at a user U (FIG. 2) location above and forward of the component panel 20. Referring to FIG. 2, this embodiment of the minitower housing 12 is well-suited for applications in which the support surface 14 is a floor or a shelf near to floor level. During operation, the first foot 60 and the vents 70 direct sound waves 97 rearwardly and downward in the space between the support surface 14 and the under section 30. The minitower housing 12 accordingly directs the sound waves 97 away from the user location U and into a space that may dissipate the intensity of the sound waves. The minitower housing 12, therefore, is expected to reduce the decibel level of the fan noise at the user location U.

The embodiment of the minitower housing 12 shown in FIGS. 1–3 is also expected to provide more convenient access to the external hardware components 50 at the component panel 20. By tilting the housing 20 at the angle α, the component controls 52 face upwardly toward the user location U. The component controls 52 are accordingly easier to view and manipulate. For example, when a tray 54 of the CD-ROM drive 50b is extended in an open position, the tray control button 52b is expected to be easier to view and manipulate because the component panel 20 faces upwardly toward the user. Therefore, the embodiment of the minitower housing 12 is also expected to provide better visual identification and physical manipulation of the component controls.

Figure 4:
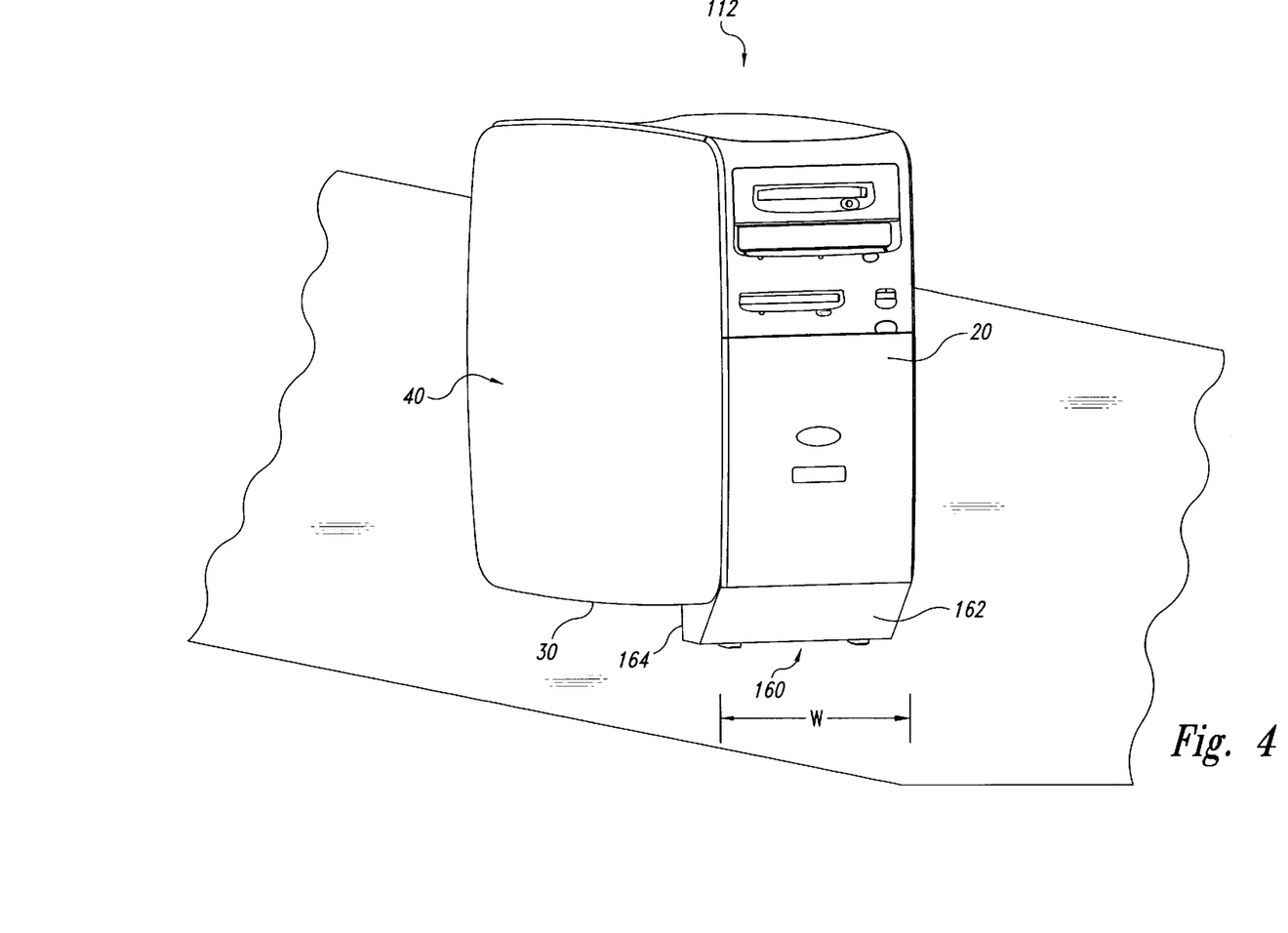
FIG. 4 is a front isometric view of another minitower computer in accordance with another embodiment of the invention.
Figure 5:
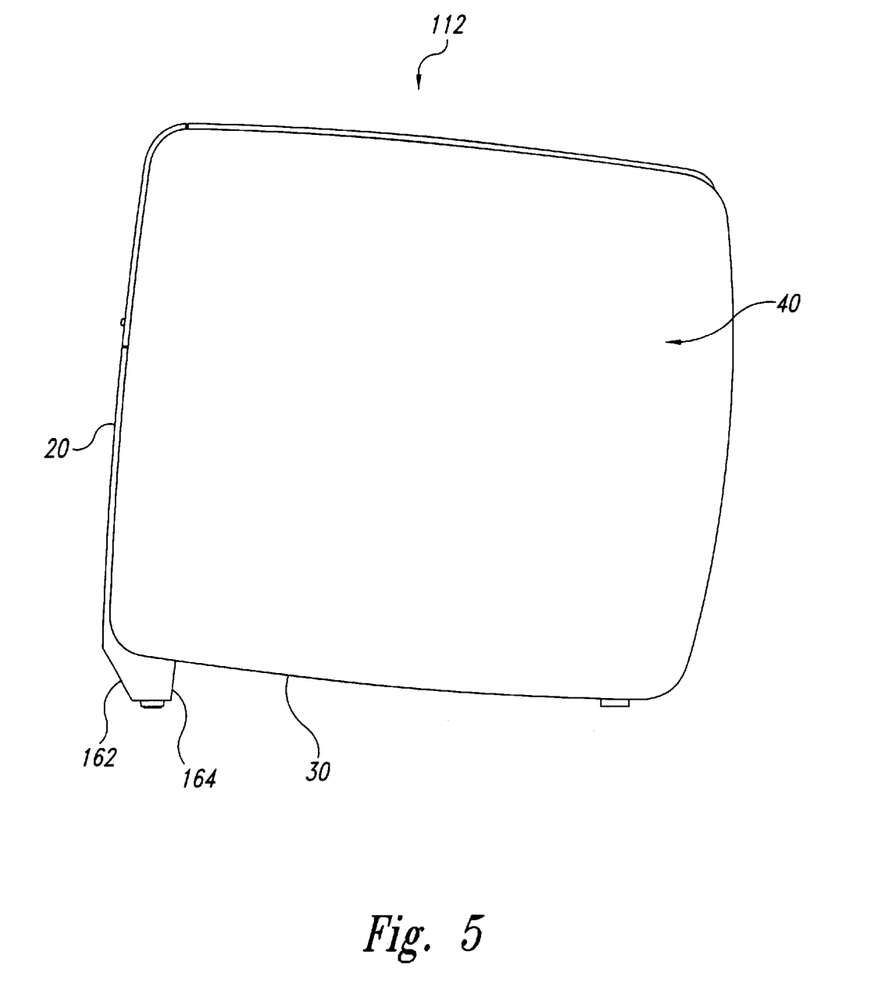
FIG. 5 is a side elevational view of the minitower computer of FIG. 4.

FIG. 4 is a front isometric view and FIG. 5 is a side elevational view of a minitower computer housing 112 in accordance with another embodiment of the invention. The housing 112 is similar to the housing 12 described above, and thus like reference numbers refer to like parts. In this embodiment, the housing 112 includes a first foot 160 having a flat front surface 162 and a flat rear surface 164. As shown in FIGS. 1–5, the first foot 60 and the first foot 160 both have front surfaces and back surfaces that extend across the width W of their respective housings 12 and 112. The first foot 60 and the first foot 160 are both expected to inhibit the sound waves from passing forwardly in front of the component panels 20 toward the user because they completely block the under section 30 from being directly open to the user. The computer housings 12 and 112, therefore, are expected to further reduce the decibel level at a user location U positioned in front of and above the computer housings.

Figure 6:
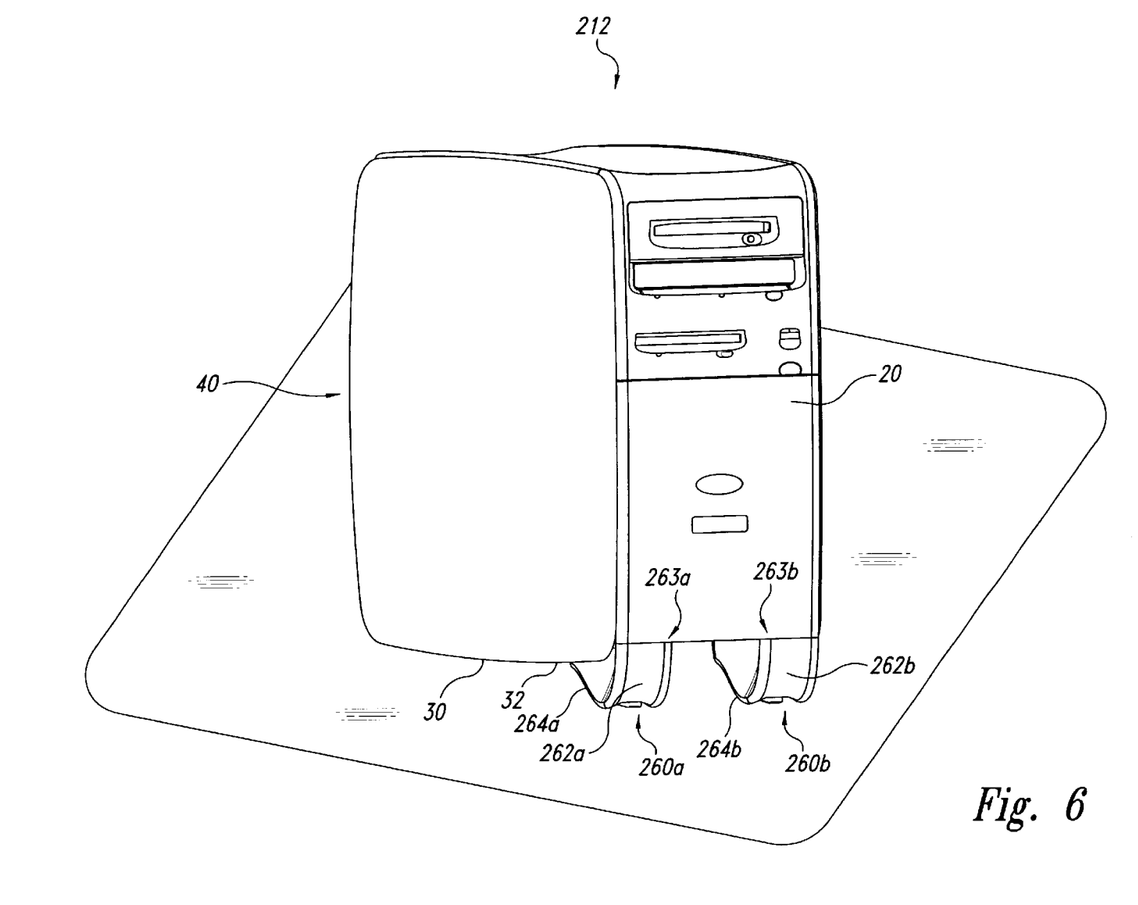
FIG. 6 is a front isometric view of yet another minitower computer in accordance with yet another embodiment of the invention.

FIG. 6 is a front isometric view of a computer housing 212 in accordance with still another embodiment of the present invention. The computer housing 212 is also similar to the computer housing 12, and thus like reference numbers refer to like components. In this embodiment, the housing 212 includes a first foot 260a and a second foot 260b positioned at the front portion 32 of the bottom panel 30. The first foot 260a extends widthwise across the component panel 20 from a first edge of the component panel 20 to a first 30 intermediate point 263a. Similarly, the second foot 260b extends widthwise across the component point 20 from a second edge to a second intermediate point 263b. The first foot 260a is thus spaced apart from the second foot 260b along the width of the component panel 20 by the distance between the first and second intermediate points 263a and 263b. The first foot 260a has a front surface 262a and a back surface 264a, and the second foot 260b has a front surface 262b and a back surface 264b. The first foot 260a and the second foot 260b may also each have a number of vents or openings (not shown) in their respective back surfaces 264a and 264b similar to the vents 70 in the back surface 64 of the first foot 60 (shown in FIG. 3).

Figure 7:
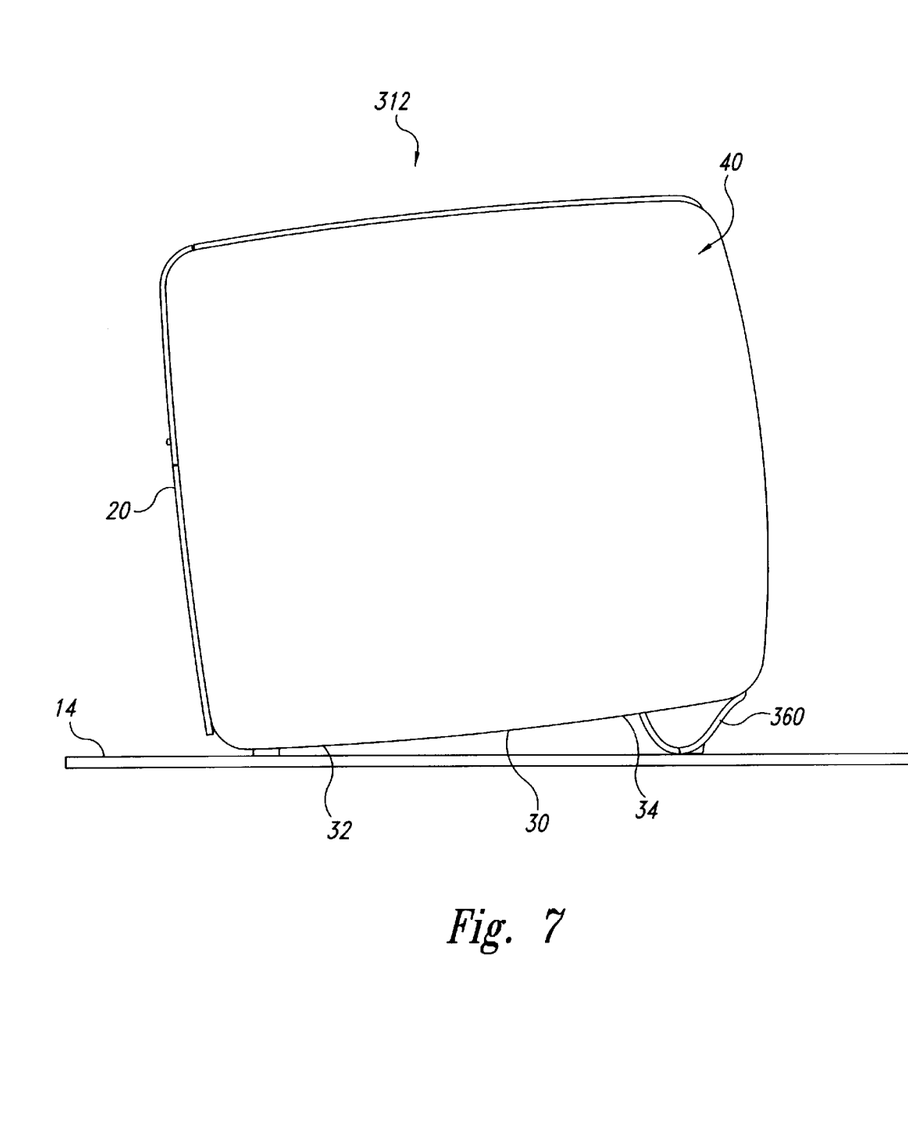
FIG. 7 is a side elevational view of still another minitower computer in accordance with still another embodiment of the invention.

FIG. 7 is a side elevational view of a minitower computer housing 312 in accordance with still another embodiment of the invention. The minitower housing 312 is similar to the housing 12 described above, and thus like reference numbers refer to like parts. In this embodiment, however, the housing 312 has a first foot 360 proximate to the rear portion 34 of the bottom panel 30. The first foot 360 accordingly tilts the component panel 20 forwardly and downwardly toward the support surface 14. The first foot 360 can also have a number of vents or openings in a back surface facing rearwardly.

From the foregoing it will be appreciated that, although specific embodiments of the invention have been described herein for purposes of illustration, various modifications may be made without deviating from the spirit and scope of the invention. For example, a computer housing may have a first foot depending from a forward portion of a bottom panel and a second foot depending from a rear portion of the bottom panel. The first foot can be taller than the second foot to tilt the housing upwardly and rearwardly, or the first foot can be shorter than the second foot to tilt the housing downwardly and forwardly. Each of the first foot and the second foot can be similar to the first foot 60 shown in FIGS. 1–3 to extend across the width of the computer housing and to provide rearwardly facing vents. Accordingly, the invention is not limited except as by the appended claims.

What is claimed is:

1. A minitower computer housing, comprising:
   a component panel having a plurality of bays configured to receive external hardware components, the component panel having an upper portion and a lower portion;
   an under section extending rearwardly from the component panel, the under section having a first segment at the lower portion of the component panel and a second segment spaced apart rearwardly from the first segment;
   a cover section connected to the component panel and the under section, the cover section extending rearwardly from the upper portion of the component panel and along the under section, wherein the component panel, the under section and the cover section define an enclosure to protect internal hardware components; and
   a first tilt member depending from the under section at a location proxinate to either the first or second segment to tilt the component panel either upwardly or downwardly, respectively, the first tilt member having a vent in fluid communication with the enclosure to provide air flow through the housing, and the vent facing rearwardly with respect to the component panel.

2. The housing of claim 1 wherein:
   the first tilt member has a front surface and a back surface, the front surface extending downwardly from the component panel to a bottom region and the back surface extending upwardly from the bottom region to the under section; and
   the vent comprises an opening in the back surface of the first tilt member.

3. The housing of claim 2 wherein:
   the component panel has a height and a width, the height being greater than the width; and
   the front surface of the first tilt member extends across the width of the housing at the lower portion of the component panel.

4. The housing of claim 3 wherein the front surface of the first tilt member curves rearwardly from the component panel to the bottom region.

5. The housing of claim 3 wherein the front surface of the first tilt member comprises a flat surface inclined rearwardly and downwardly from the component panel.

6. The housing of claim 1, further comprising a second tilt member depending from the under section at the first or second segment from which the first tilt member depends, wherein the first tilt member extends widthwise across the lower portion of the component panel from a first edge of the component panel to a first intermediate point, and the second tilt member extends widthwise across the lower portion of the component panel from a second edge of the component panel to a second intermediate point, the first and second tilt members being spaced apart from one another along the widthwise dimension of the component panel by a distance between the first and second intermediate points.

7. The housing of claim 6 wherein:
   the first tilt member has a first front surface and a first back surface, the first front surface extending downwardly from the component panel to a bottom region and the first back surface extending upwardly from the bottom region to the under section;
   the second tilt member has a second front surface and a second back surface, the second front surface extending downwardly from the component panel to a bottom region and the second back surface extending upwardly from the bottom region to the under section; and
   the vent comprises a first opening in the first back surface of the first tilt member and a second opening in the second back surface of the second tilt member.

8. A minitower computer housing, comprising:
   a front panel having a plurality of ports configured to receive components, the front panel having a height extending from an upper portion to a lower portion, and the front panel having a width less than the height;
   a bottom panel extending rearwardly from the front panel, the bottom panel having a front portion at the lower portion of the front panel and a rear portion spaced rearwardly apart from the front portion;
   an upper section extending rearwardly from the front panel and along the bottom panel, wherein the front panel, the bottom panel and the upper section define an enclosure;
   a first foot depending from either the front portion or the rear portion of the bottom panel to tilt the front face either upwardly or downwardly, respectively; and
   an air vent having an opening in the first foot to provide air flow between the enclosure and an external environment.

9. The housing of claim 8 wherein:
   the first foot has a front surface and a back surface, the front surface extending downwardly from the front panel to a bottom region and the back surface extending upwardly from the bottom region to the bottom panel; and
   the vent comprises an opening in the back surface of the first foot.

10. The housing of claim 9 wherein the front surface of the first foot extends across the width of the housing at the lower portion of the front panel.

11. The housing of claim 10 wherein the front surface of the first foot curves rearwardly from the front panel to the bottom region.

12. The housing of claim 10 wherein the front surface of the first foot comprises a flat surface inclined rearwardly and downwardly from the front panel.

13. The housing of claim 8, further comprising a second foot depending from the bottom panel at the front or rear portion from which the first foot depends, wherein the first foot extends widthwise across the lower portion of the front panel from a first edge of the front panel to a first intermediate point, and the second foot extends widthwise across the lower portion of the front panel from a second edge of the front panel to a second intermediate point, the first foot and the second foot being spaced apart from one another along the widthwise dimension of the front panel by a distance between the first and second intermediate points.

14. The housing of claim 13 wherein:
the first foot has a first front surface and a first back surface, the first front surface extending downwardly from the front panel to a bottom region and the first back surface extending upwardly from the bottom region to the bottom panel;
the second foot has a second front surface and a second back surface, the second front surface extending downwardly from the front panel to a bottom region and the second back surface extending upwardly from the bottom region to the bottom panel; and
the vent comprises a first opening in the first back surface of the first foot and a second opening in the second back surface of the second foot.

15. A minitower computer housing, comprising:
a front panel having a plurality of ports configured to receive components, the front panel having a height extending from an upper portion to a lower portion, and the front panel having a width less than the height;
a bottom panel extending rearwardly from the front panel, the bottom panel having a front portion at the lower portion of the front panel and a rear portion spaced rearwardly apart from the front portion;
a top panel extending rearwardly from the front panel, the top panel having a front segment at the upper portion of the front panel and a rear segment spaced rearwardly apart from the front segment;
a back panel having a top section attached to the top panel and a bottom section attached to the bottom panel;
a first side panel attached to a first side of the front panel, the bottom panel, the top panel and the back panel, and a second side panel attached to a second side of the front panel, the bottom panel, the top panel and the back panel, wherein the front panel, the bottom panel, the top panel, the back panel and the first and second side panels define a cavity to house internal hardware components;
a first foot depending from either the front or rear portion of the bottom panel to tilt the front panel either upwardly or downwardly, respectively; and
an air vent having an opening in the first foot to provide air flow between the cavity and an external environment.

16. The housing of claim 15 wherein:
the first foot has a front surface and a back surface, the front surface extending downwardly from the front panel to a bottom region and the back surface extending upwardly from the bottom region to the bottom panel; and
the vent comprises an opening in the back surface of the first foot.

17. The housing of claim 16 wherein the front surface of the first foot extends across the width of the housing at the lower portion of the front panel.

18. The housing of claim 17 wherein the front surface of the first foot curves rearwardly from the front panel to the bottom region.

19. The housing of claim 17 wherein the front surface of the first foot comprises a flat surface inclined rearwardly and downwardly from the front panel.

20. The housing of claim 15, further comprising a second foot depending from the bottom panel at the front or rear portion from which the first foot depends, wherein the first foot extends widthwise across the lower portion of the front panel from a first edge of the front panel to a first intermediate point, and the second foot extends widthwise across the lower portion of the front panel from a second edge of the front panel to a second intermediate point, the first foot and the second foot being spaced apart from one another along the widthwise dimension of the front panel by a distance between the first and second intermediate points.

21. The housing of claim 20 wherein:
the first foot has a first front surface and a first back surface, the first front surface extending downwardly from the front panel to a bottom region and the first back surface extending upwardly from the bottom region to the bottom panel;
the second foot has a second front surface and a second back surface, the second front surface extending downwardly from the front panel to a bottom region and the second back surface extending upwardly from the bottom region to the bottom panel; and
the vent comprises a first opening in the first back surface of the first foot and a second opening in the second back surface of the second foot.

22. A minitower computer, comprising:
a housing including a component panel, an under section extending rearwardly from the component panel, a cover section connected to the component panel and the under section, a first tilt member depending from the under section, and a vent in the first tilt member, wherein the component panel, the under section and the cover section define an enclosure, and wherein the vent provides air flow through the tilt member to the enclosure;
a processor in the enclosure; and
a memory device in the enclosure, the memory device being operably coupled to the processor.

23. The computer of claim 22 wherein:
the first tilt member has a front surface and a back surface, the front surface extending downwardly from the component panel to a bottom region and the back surface extending upwardly from the bottom region to the under section; and
the vent comprises an opening in the back surface of the first tilt member.

24. The computer of claim 23 wherein:
the component panel has a height and a width, the height being greater than the width; and
the front surface of the first tilt member extends across the width of the housing at the lower portion of the component panel.

25. The computer of claim 24 wherein the front surface of the first tilt member curves rearwardly from the component panel to the bottom region.

26. The computer of claim 24 wherein the front surface of the first tilt member comprises a flat surface inclined rearwardly and downwardly from the component panel.

27. The computer of claim 24, further comprising a second foot depending from the bottom panel at the front or rear portion from which the first foot depends, wherein the first foot extends widthwise across the lower portion of the front panel from a first edge of the front panel to a first intermediate point, and the second foot extends widthwise across the lower portion of the front panel from a second edge of the front panel to a second intermediate point, the first foot and the second foot being spaced apart from one another along the widthwise dimension of the front panel by a distance between the first and second intermediate points.

28. The computer of claim 27 wherein:

the first foot has a first front surface and a first back surface, the first front surface extending downwardly from the front panel to a bottom region and the first back surface extending upwardly from the bottom region to the bottom panel;

the second foot has a second front surface and a second back surface, the second front surface extending downwardly from the front panel to a bottom region and the second back surface extending upwardly from the bottom region to the bottom panel; and the vent comprises a first opening in the first back surface of the first foot and a second opening in the second back surface of the second foot.

29. The computer of claim 22, further comprising a second tilt member depending from the under section at the first or second segment from which the first tilt member depends, wherein the first tilt member extends widthwise across the lower portion of the component panel from a first edge of the component panel to a first intermediate point, and the second tilt member extends widthwise across the lower portion of the component panel from a second edge of the component panel to a second intermediate point, the first and second tilt members being spaced apart from one another along the widthwise dimension of the component panel by a distance between the first and second intermediate points.

30. The computer of claim 29 wherein:

the first tilt member has a first front surface and a first back surface, the first front surface extending downwardly from the component panel to a bottom region and the first back surface extending upwardly from the bottom region to the under section;

the second tilt member has a second front surface and a second back surface, the second front surface extending downwardly from the component panel to a bottom region and the second back surface extending upwardly from the bottom region to the under section; and the vent comprises a first opening in the first back surface of the first tilt member and a second opening in the second back surface of the second tilt member.

31. A minitower computer, comprising:

a housing including a front panel, a bottom panel extending rearwardly from the front panel, an upper section extending from the front panel and along the bottom panel, a first foot depending from the bottom panel, and vent having an opening in the foot facing rearwardly, wherein the front panel, the bottom panel and the upper section define an enclosure, wherein the first foot depends from the bottom panel to tilt the front face either upwardly or downwardly, and wherein the air vent provides air flow between the enclosure and an external environment, a processor positioned in the enclosure; and a memory device positioned in the enclosure, the memory device being operably coupled to the processor.

32. The computer of claim 31 wherein:

the first foot has a front surface and a back surface, the front surface extending downwardly from the front panel to a bottom region and the back surface extending upwardly from the bottom region to the bottom panel; and the vent comprises an opening in the back surface of the first foot.

33. The computer of claim 32 wherein the front surface of the first foot extends across the width of the housing at the lower portion of the front panel.

34. The computer of claim 33 wherein the front surface of the first foot curves rearwardly from the front panel to the bottom region.

35. The computer of claim 33 wherein the front surface of the first foot comprises a flat surface inclined rearwardly and downwardly from the front panel.

* * * * *

UNITED STATES PATENT AND TRADEMARK OFFICE
CERTIFICATE OF CORRECTION

PATENT NO.   : 6,222,735 B1
DATED        : April 24, 2001
INVENTOR(S)  : Michael Leman et al.

It is certified that error appears in the above-identified patent and that said Letters Patent is hereby corrected as shown below:

<u>Title page,</u>
Item [56], OTHER PUBLICATIONS, "Lehman" should be -- Leman --;

<u>Column 4,</u>
Line 61, delete "30";

<u>Column 5,</u>
Line 51, "proxinate" should be -- proximate --.

Signed and Sealed this

Fifth Day of August, 2003

JAMES E. ROGAN
*Director of the United States Patent and Trademark Office*